United States Patent [19]

Himuro

[11] Patent Number: 5,223,059
[45] Date of Patent: Jun. 29, 1993

[54] PNEUMATIC TIRES WITH DECREASINGLY INCLINED TREAD GROOVES

[75] Inventor: Yasuo Himuro, Kodaira, Japan

[73] Assignee: Bridgestone Corporation, Tokyo, Japan

[21] Appl. No.: 800,421

[22] Filed: Nov. 29, 1991

[30] Foreign Application Priority Data

Nov. 30, 1990 [JP] Japan .................................. 2-330607

[51] Int. Cl.$^5$ ............................................. B60C 11/11
[52] U.S. Cl. ............................................... 152/209 R
[58] Field of Search ............ 152/209 R, 209 D, 209 B; D12/146–147, 144, 148

[56] References Cited

U.S. PATENT DOCUMENTS

| D. 278,893 | 5/1985 | Lash .................... D12/146 |
| D. 283,499 | 4/1986 | Hammond ............ D12/146 |
| D. 283,501 | 4/1986 | Hitzky .................. D12/147 |
| D. 312,232 | 11/1990 | Wallet et al. ......... D12/147 |
| D. 316,532 | 4/1991 | Tsuda et al. ......... D12/147 |
| D. 326,440 | 5/1992 | Kolowski et al. .... D12/147 |
| 2,154,290 | 4/1939 | Snyder . |
| 3,645,314 | 2/1972 | Verdier ............... 152/209 R |
| 4,962,801 | 10/1990 | Tsuda . |

FOREIGN PATENT DOCUMENTS

| 1001614 | 1/1957 | Fed. Rep. of Germany ... 152/209 R |
| 0191279 | 8/1957 | Fed. Rep. of Germany ... 152/209 R |
| 1213276 | 5/1959 | Fed. Rep. of Germany . |
| 3074208 | 3/1991 | Japan ............................ 152/209 R |

Primary Examiner—Michael W. Ball
Assistant Examiner—Nancy T. Krawczyk
Attorney, Agent, or Firm—Sughrue, Mion, Zinn, Macpeak & Seas

[57] ABSTRACT

A pneumatic tire comprises a tread having at least one circumferential groove formed in a central zone of a treading surface thereof, and a plurality of inclined grooves formed in at least one of side zones which are axially adjacent to axially opposite sides of said central zone and each have a width equal to substantially ¼ of that of said treading surface of the tread. A plurality of the inclined grooves extend obliquely upwardly from a side of the central zone toward an end of the tread as viewed from a front face of the tire in the state that the tire is fitted to a vehicle, and each of a plurality of the inclined grooves are opened to the end of the tread. An angle of each of a plurality of the inclined grooves is gradually decreased as the groove goes away from the central zone, this angle being an acute angle defined by the inclined groove and a circumferential straight line on an axially outer side of the tire.

13 Claims, 7 Drawing Sheets

PNEUMATIC TIRES WITH DECREASINGLY INCLINED TREAD GROOVES

BACKGROUND OF THE INVENTION

1. Field of the Invention

The present invention relates to pneumatic tires which are to be used for vehicles attaching importance to comfortability inside vehicle chambers during long touring or ordinary running. The pattern of the tread effectively suppresses pattern noise not only during straight running but also during turning.

2. Description of the Related Art

So-called directional patterns have been generally being used as tread patterns aiming at improvement of comfortability a inside vehicle chamber while sufficiently assuring wet performance and dry performance. In these directional tires, in order to prevent, production of great impact energy which would be caused when edges of blocks defined by inclined grooves strike against road during rotation of the tire and in order to assure rapid drainage of the inclined grooves, an angle of that portion of each of the inclined grooves which extends toward a central zone of a tread is set relatively small with respect to an equatorial plane of the tire under due consideration of a ground-contacting print of the tire. An angle of that portion of each of the inclined grooves which extends on a side zone of the tread is set relatively great with respect to the tire equatorial plane.

Figure 5A:
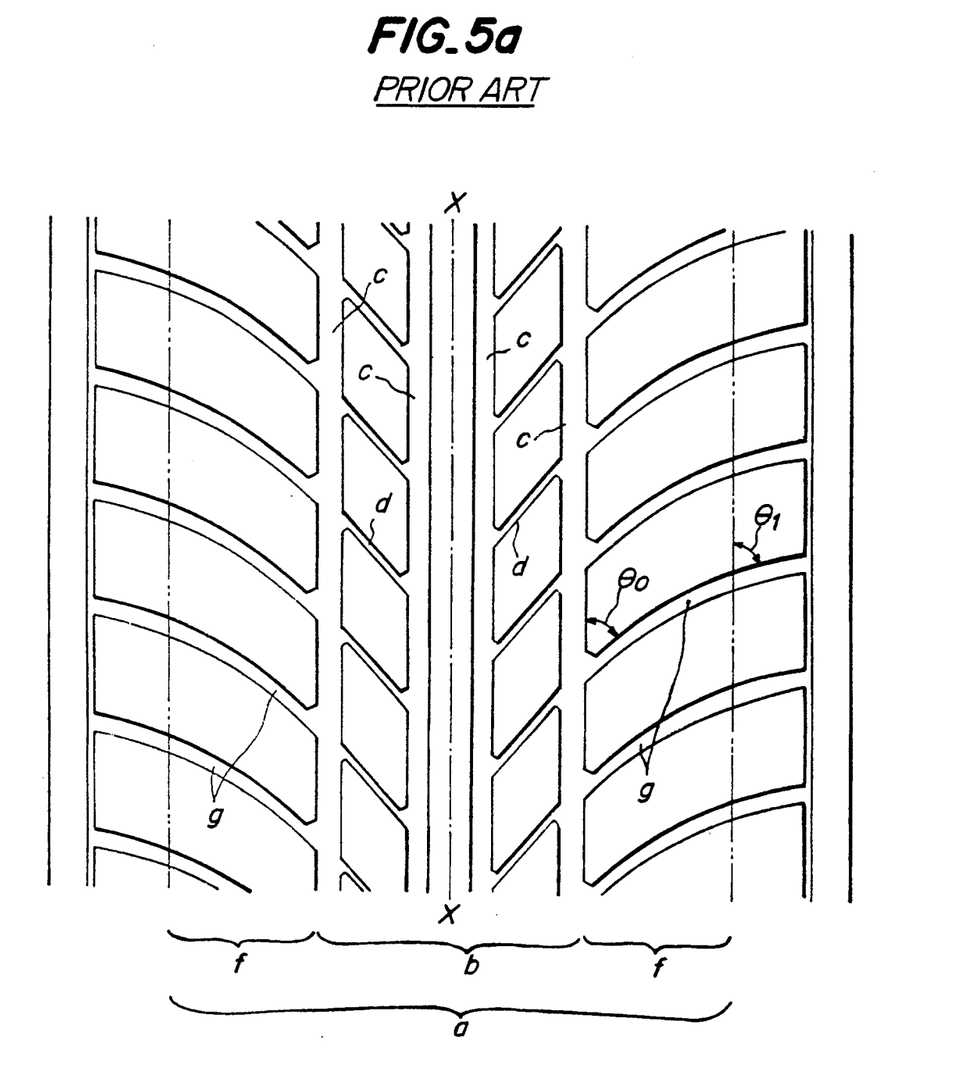
FIGS. 5(a) and (b) illustrate the tread pattern and the ground-contacting print of the prior art tire.

FIG. 5(a) is a directional tread pattern as viewed from a front side of the tire when the tire is fitted to a vehicle. In this tread pattern, since circumferential grooves c exhibits sufficient drainage performance in the central zone b of a treading surface a of the tread, pattern noises are to be reduced by providing inclined grooves d positioned in tire-circumferentially staggered phases on opposite sides, respectively, through the tire equatorial plane X—X or by forming a rib e on the central portion, while other performances are not sacrificed. Each side zone f adjacent to the central zone b contributes less to a reduction in the pattern noises during straight running of the vehicle, but it greatly contributes to drainage. For this reason, a plurality of inclined grooves g are provided and spaced in the circumferential direction of the tire such that an angle $\theta_o$ of each of the inclined grooves relative to the tire equatorial plane X—X is relatively small in a portion of the side zone near the central zone b and an angle $\theta_1$ of each of the inclined grooves relative to the tire equatorial plane X—X is relatively large in a portion of the side zone near an end of the tread.

Figure 5B:
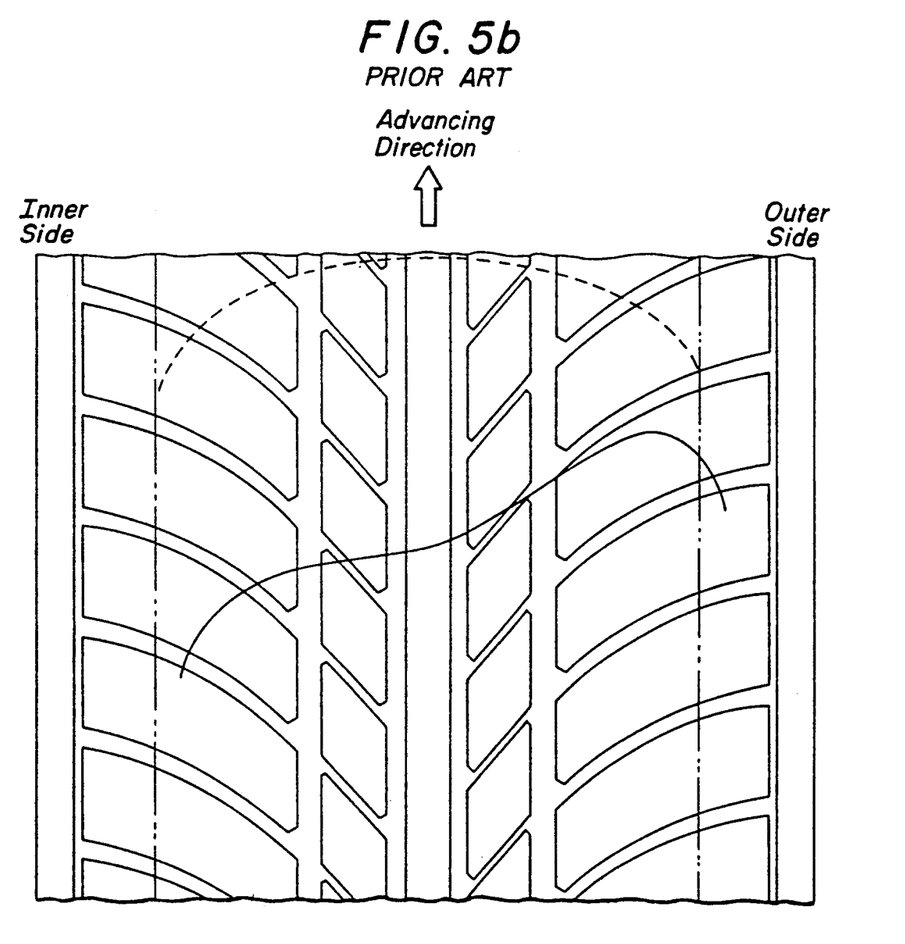

As shown in FIG. 5(b) showing a ground-contacting print of the tire in FIG. 5(a) by a broken line, a ground-contacting contour of the tire of this prior art greatly differs from an extending direction of the inclined grooves during straight running of the vehicle. Therefore, the pattern noises can be suppressed to a fully low level. On the other hand, the ground-contacting contour of the tire is changed to a shape deviated toward an axially outer side of turning as shown by a solid line in FIG. 5(b) during turning because of movement of the load. Consequently, the ground-contacting contour of the tire approaches the inclined grooves d and g. In addition, since a plane pressure of the tread becomes particularly greater on the axially outer side in the turning direction, great pattern noises resulting from striking of blocks defined by the inclined grooves d and g against road are suddenly produced depending upon the degree of the turning. This is more serious as the level of the pattern noises during straight running is smaller.

SUMMARY OF THE INVENTION

It is an object of the present invention to advantageously solve the above-mentioned problems possessed by the prior art, and particularly to provide pneumatic tires which can not only exhibit excellent wet performance and dry performance but also effectively reduce pattern noise during both straight running and turning of a vehicle by providing inclined grooves of which shape greatly differ from a ground-contacting contour line of the tire during both the straight running and the turning of the vehicle.

The pneumatic tire according to the present invention comprises a tread having at least one circumferential groove formed in a central zone of a treading surface thereof, and a plurality of inclined grooves formed in at least one of side zones, preferably on each of both side zones, the side zones being axially adjacent to the central zone and having a width equal to substantially ¼ of that of the treading surface of the tread, and a plurality of the inclined grooves extending obliquely upwardly from a side of the central zone toward an end of the tread as viewed from a front face of the tire in the state that the tire is fitted to a vehicle, and each of a plurality of the inclined grooves being opened to the end of the tread, wherein an angle of each of a plurality of the inclined grooves is gradually decreased as the groove goes away from the central zone, the angle being an acute angle defined by the inclined groove and a circumferential straight line on an axially outer side of the tire (or relative to an equatorial plane of the tire).

Preferably, the above angle of each of the inclined grooves with respect to the tire equatorial plane is set in a range of 35° to 55° at a portion near the central zone of the tread and in a range of 15°-35° at a portion near the end of the tread.

Further, it is preferable that a pair of circumferential grooves are formed on axially opposite side portions of the central zone, respectively, and a plurality of the inclined grooves are opened to respective one of a pair of the circumferential grooves.

Furthermore, it is preferable that at least either at least two rows of blocks or at least two circumferential ribs are formed in the central zone of the tread. In addition, it is preferable that at least one narrow groove is formed in each of the side zones, the at least one narrow groove extending in a circumferential direction of the tire. The narrow groove preferably has such a groove width that side walls of the narrow groove contact each other at a location where the tire contacts ground.

According to the pneumatic tire of the present invention having the above-constructed tread pattern, during both straight running and turning of the vehicle, at least one circumferential groove formed in the central zone of the treading surface of the tread functions to afford sufficient drainage property upon the tire, and the inclined grooves function to effectively reduce the pattern noises without sacrificing other tire performance.

When the above angle of each of the inclined grooves with respect to the tire equatorial plane is set in a range of 35° to 55° at a portion near the central zone of the tread and in a range of 15°-35° at a portion near the end of the tread, wear resistance of the land portion of the pneumatic tire according to the present invention can be more assuredly ensured. Also, the pattern noises are effectively reduced during straight running of the vehicle. Further, since the inclined grooves greatly deviate from the ground-contacting contour of the tire during turning of the tire, the occurrence of the pattern noises can be fully prevented.

In addition, since the width of the side zone of the tread is set at substantially ¼ of the width of the treading surface of the tread according to the present invention, shoulder blocks defined in the side zone have a width great enough to ensure excellent steering stability.

Further, when the inclined grooves are opened to the tread end at their one ends, excellent drainage can be attained by the inclined grooves.

Further, when a pair of the circumferential grooves are formed on the axially opposite side portions of the central zone, respectively, and a plurality of the inclined grooves are also opened to respective one of a pair of circumferential grooves, more excellent drainage of the inclined grooves can be assured.

Furthermore, when at least two rows of blocks are formed in the central zone of the tread, these rows of the blocks afford high stability during straight running due to sufficient ground-contacting and block rigidity. Moreover, when at least two circumferential ribs are formed in the central zone of the tread, these ribs make a treading-in angle of the tire during rotating relatively small due to their circumferential rigidity being low. The ribs enable the tire to smoothly contact the road to mitigate striking components of the tread pattern and effectively reduce the pattern noises. In addition, when at least one narrow circumferential groove is formed on at least one of the side zones, the ground-contacting performance of shoulder blocks defined by the inclined grooves can be further enhanced without influencing the pattern noise. The narrow groove preferably has such a width that side walls of the narrow groove contact each other at a location where the tire contacts ground.

These and other objects, features and advantages of the invention will be appreciated upon reading of the following description of the invention when taken in conjunction with the attached drawings, with the understanding that some modifications, variations and changes of the same could be made by the skilled person in the art to which the invention pertains, without departing from the spirit of the invention or the scope of claims appended hereto.

BRIEF DESCRIPTION OF THE ATTACHED DRAWINGS

For a better understanding of the invention, reference is made to the attached drawings, wherein.

DETAILED DESCRIPTION OF THE PRESENT INVENTION

The present invention will be now explained in more detail with reference to FIGS. 1(a) and (b). Since the internal structure of the tire is the same as that of ordinary radial tires, illustration thereof is omitted in FIGS. 1(a) and (b).

Figure 1A:
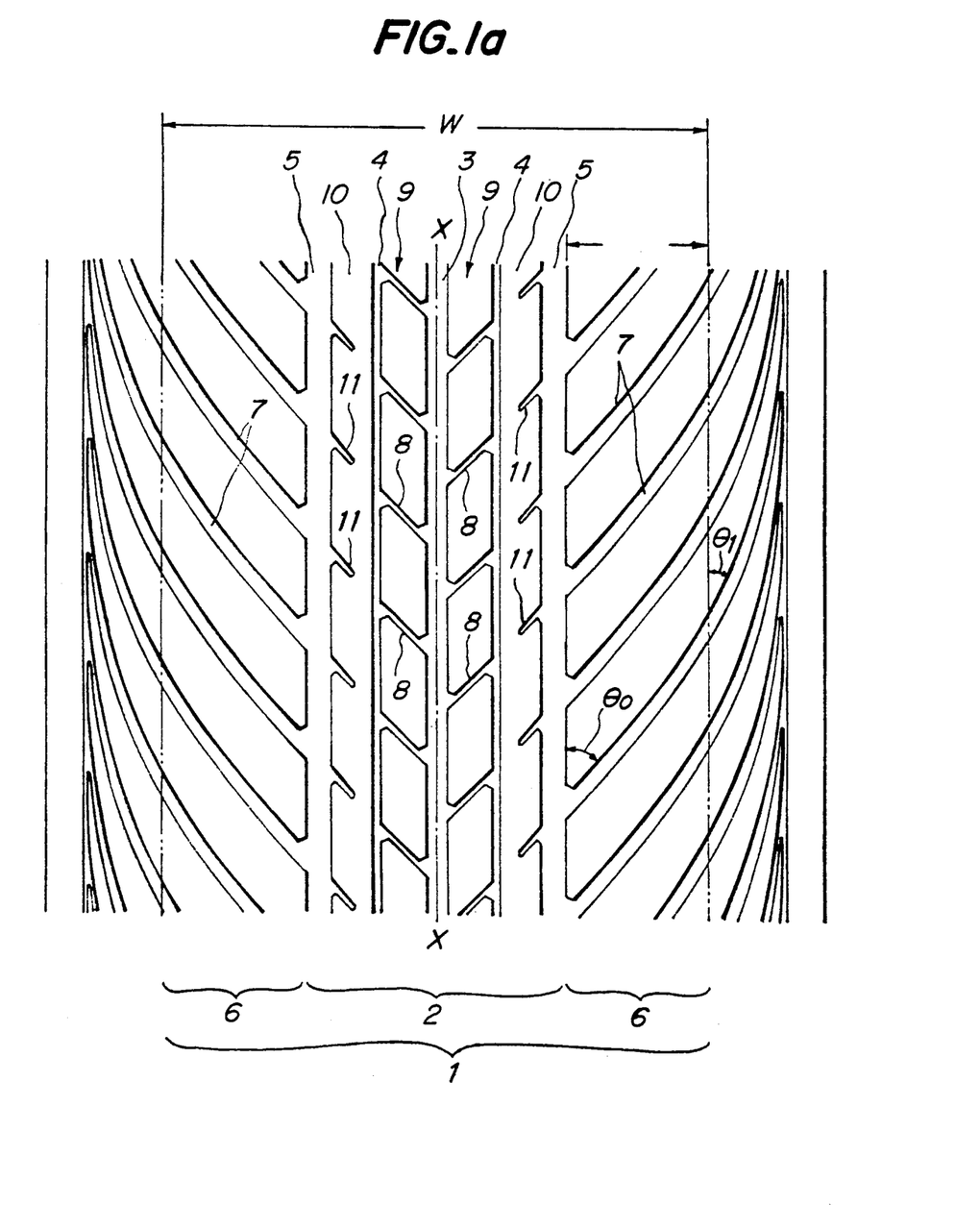
FIGS. 1(a) and (b) illustrate a tread pattern and a ground-contacting print of an embodiment of the present invention, respectively.
Figure 1B:
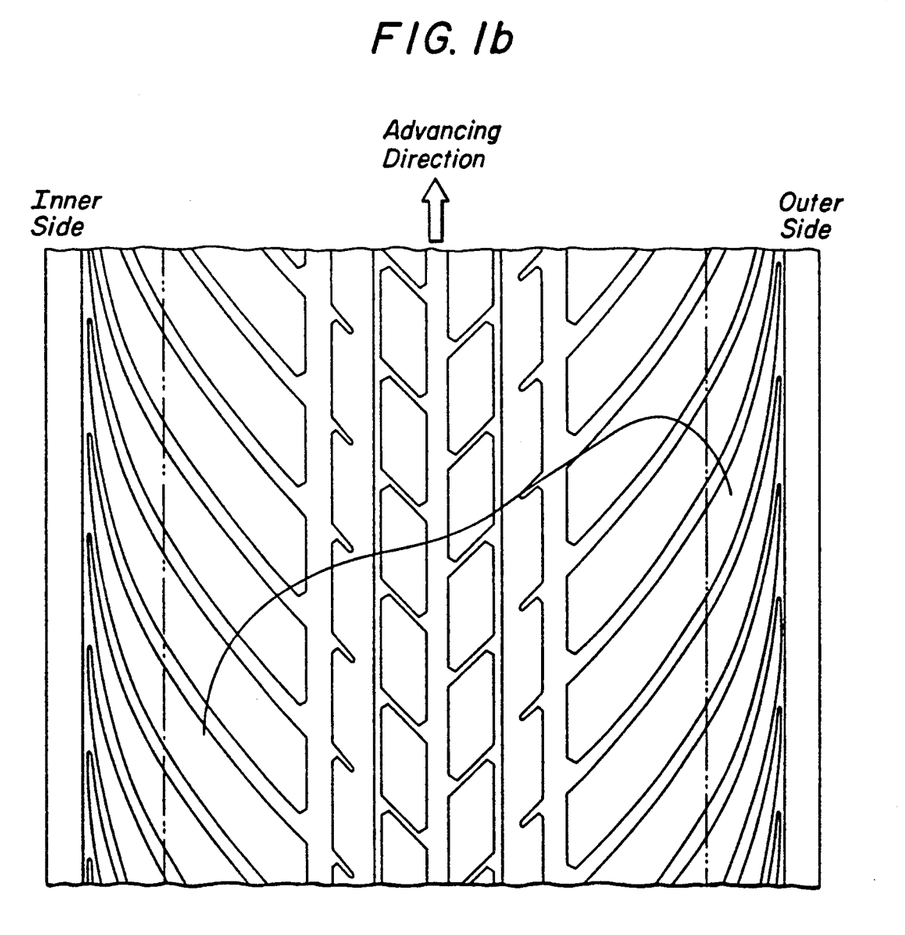

In FIG. 1(a), circumferential straight groove 3 is formed on a central zone 2 of a treading surface 1 of a tread along an equatorial plane X—X of the tire, and a circumferential auxiliary groove 4 is formed on each of opposed side portions through the circumferential straight groove 3. Further, a pair of circumferential thick grooves 5 are formed on opposite side portions of the central zone 2, respectively. A plurality of inclined grooves 7 are formed on each of side zones 6 being adjacent to the central zone and having a width substantially equal to ¼ of the width W of the treading surface of the tread, while the inclined grooves 7 are spaced from adjacent ones by a given interval in the circumferential direction of the tire. Each inclined groove 7 is upwardly obliquely extended from on a side of the central zone toward an end of the tread as viewed from an front side of the tire in the state that the tire is fitted to a vehicle. The inclined groove 7 is opened to both the end of the tread and the circumferential thick groove 5. The angle of each of the inclined grooves 7 is made gradually smaller with respect to the tire equatorial plane X—X as the inclined groove goes away from the central zone. Preferably, this angle is set in a range of 35°–55° at a portion near the central zone and in a range of 15°–35° at a portion near the end of the tread.

In the illustrated embodiment, auxiliary inclined grooves 8 are formed on each of the opposite sides through the circumferential straight groove 3 and between this groove 3 and the circumferential auxiliary groove 4 such that the auxiliary inclined grooves extend in the same direction of extension lines of the respective inclined grooves 7 in the side zone. The auxiliary grooves 8 on one side are staggered in phase by a half of an arranging pitch of the grooves 8 in the tire circumferential direction relative to the grooves 8 on the other side. Thereby, two rows of blocks, 9, are formed on the opposite sides of the circumferential straight grooves 3, while a rib 10, which is defined by the circumferential auxiliary groove 4 and the circumferential thick groove 5, is formed aside the block row 9 on a side of the tread end.

In this embodiment, the width W of the treading surface of the tread and that of the side zone 6 of the tread are set at 145 mm and 38 mm, respectively, and the widths of the circumferential straight groove 3, the circumferential auxiliary groove 4, the circumferential thick groove 5, and the auxiliary inclined groove 8 defining the block row 9 are set at 6.0 mm, 2.0 mm, 7.0 mm, and 1.5 mm, respectively. The angle of the auxiliary inclined groove 8 is set at 45° relative to the tire equatorial plane X—X. The width of each of the notches 11 formed in the rib 10 and located substantially along extensions of the inclined grooves 7 is set at 1.5 mm, and the angle of the notch 11 is set at 45° relative to the tire equatorial plane X—X.

Further, the angle of each of the inclined grooves 7 extended on the side zone 6 of the tread relative to the tire equatorial plane X—X is set at $\theta_0 = 45°$ for an end portion on the side of the central zone and at $\theta_1 = 25°$ for the other end on the side of the tread end, and the width of the inclined groove 7 is set at 4.3 mm in the end portion on the side of the central zone and at 3.7 mm in the other end on the side of the tread end.

In the pneumatic tire having the thus constructed tread pattern, during both straight running and the turning of the vehicle, the circumferential grooves 3, 4 and 5 formed on the central zone 2 of the treading surface 1 of the tread function to afford sufficient drainage upon the tire. The auxiliary inclined grooves 8 staggered in phase in the circumferential direction as well as the ribs 10 function to reduce the pattern noises without sacrificing the other performances of the tire.

Further, in this tire, the angle of each of the inclined grooves 7 extended in the side zone 6 having the width equal to substantially ¼ of that W of the treading surface of the tread is made gradually smaller with respect to the tire equatorial plane X—X as the grooves 7 go away from the central zone 2. By so doing, wear resistance of the land portion, or the blocks here, can be sufficiently assured, and pattern noises can be effectively reduced during the straight running. Furthermore, since the shape of the inclined grooves 7 is made greatly different from that of the ground-contacting contour [dipicated by a solid line in FIG. 1(b)] of the tire during turning of the vehicle, occurrence of the pattern noises is fully prevented.

These effects can be more advantageously attained when the the angle of the inclined grooves is set in a range of 35°–55° at a portion of the side zone near the central zone and in a range of 15°–35° at a portion of the side zone near the tread end. In other words, if the angle of the inclined grooves 7 is less than 35° at the portion near the central zone 2, rigidity of corners of the blocks defined by the inclined grooves 7 and the circumferential thick grooves 5 decreases, so that wear resistance lowers. On the other hand, if this angle is more than 55°, striking forces of edges of the inclined grooves become greater during both straight running and turning when the tire contacts road, so that the pattern noises become greater. Further, if the angle of the inclined grooves 7 at the portion near the tread end is less than 15°, rigidity of the blocks decreases to lower cornering stability. On the other hand, if this angle is more than 35°, the shape of the ground-contacting contour of the tire approaches that of the inclined groove 7 during turning of the vehicle, so that, it may be feared that pattern noises become greater.

Further, since the width of the side zone 6 of the tread is set at substantially ¼ of the width W of the treading surface of the tread according to the present invention, shoulder blocks defined in the side zone 6 have a width great enough to ensure excellent steering stability.

Further, since each of the inclined grooves 7 is opened to the tread end and the circumferential thick groove 5 at opposite ends, respectively, excellent drainage can be assured by the inclined grooves 7.

In this embodiment, the two rows of blocks, 9, formed in the central zone of the tread afford high stability during straight running due to sufficient ground contacting and block rigidity. Further, since the blocks in these block rows 9 on one side zone are staggered in phase in the tire-circumferential direction from those on the other side zone by ½ of the pitches of the block, the pattern noises are further reduced. Moreover, the two ribs 10 sandwiching the block rows 9 has high rigidity in the circumferential direction, and make relative small the treading-in angle of the tire during rotation. Consequently, the ribs make the tire smoothly contact the ground, so that pattern-striking components are mitigated to effectively reduce the pattern noises.

In this embodiment, when the width of each of the inclined grooves 7 is gradually decreased from the circumferential thick groove 5 to the tread end, the area of the inclined groove in a section taken in the tire circumferential direction can be kept almost constant. Thereby, constant drainability can be assured in the wet conditions. If the width of each of the inclined grooves 7 is made uniform over the entire length, it may be difficult to ensure satisfactory rigidity of the blocks defined by the grooves 7 because the area of the inclined groove in the tire-circumferential section becomes too great. Further, since each of the inclined grooves 7 is continuously formed from the tread end to the ground non-contacting zone of the tread, sufficient drainability can be ensured in the wet conditions even when the ground-contacting area moves to an axially outer side of the tire during turning of the vehicle.

Moreover, when the width of each of the circumferential grooves provided in the central zone 2 of the tread is made equal to or smaller than that of each of a pair of the circumferential thick grooves formed on the axially opposite sides of the central zone the, sound pressure level of high frequency noises can be effectively reduced.

In the embodiment illustrated in FIGS. 1(a) and (b), since the widths of the treading surface 1, the side zone 6, the circumferential straight groove 3, the circumferential auxiliary groove 4, the circumferential thick groove 5, the auxiliary inclined groove 8, and the notch 11, and the angles of the auxiliary inclined groove 8 and the notch 11 relative to the tire equatorial plane X—X take the numerical values given above, excellent drainage can be attained in the central zone of the tread, and the pattern noises can be sufficiently reduced particularly during the straight running of the vehicle.

Further, since the inclined grooves 7 have the above inclined angles relative to the tire equatorial plane X—X and the widths varied between the portions near the central zone and the tread end, respectively, the shape of each of the inclined grooves 7 is made greatly different from that of the ground-contacting contour of the tire as shown in FIG. 1(b) as a matter of course during the straight running of the vehicle and even during the turning. By so doing, the great pattern noises abruptly occurring particularly during turning can be almost assuredly prevented.

Figure 2:
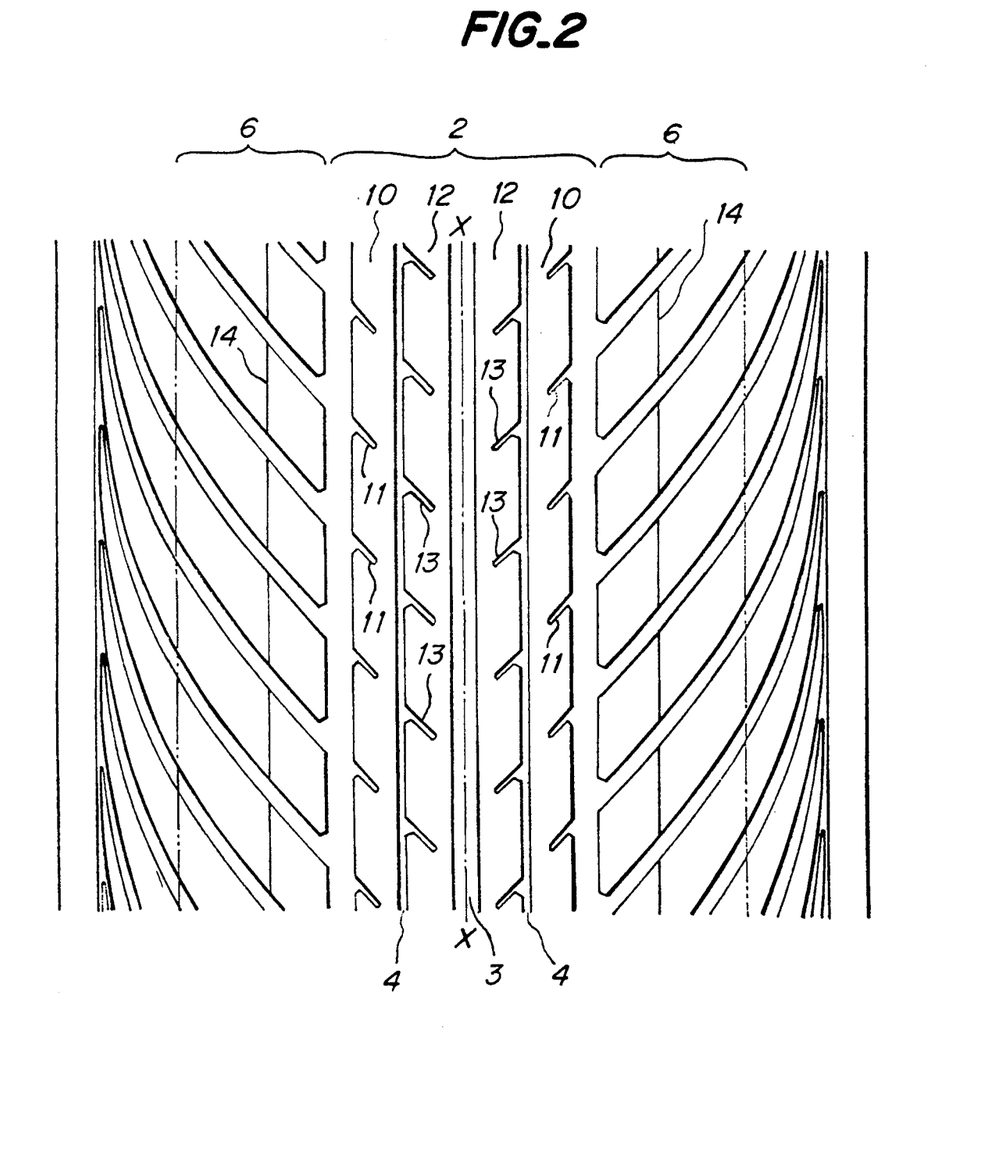
FIGS. 2 and 3 illustrate tread patterns of other embodiments of the present invention.

FIG. 2 illustrates a tread pattern as another embodiment according to the present invention. This tread pattern is the same as that shown in FIG. 1(a) except that a rib 12 is formed between the circumferential straight groove 3 and the circumferential auxiliary groove 4, notches 13 are formed in the rib 12 from a side of the tread end like those provided in the rib 10 in FIG. 1(a), and a single narrow groove 14 having a width of 0.7 mm is continuously formed in the side zone 6 continuously in the circumferential direction of the tire.

Figure 3:
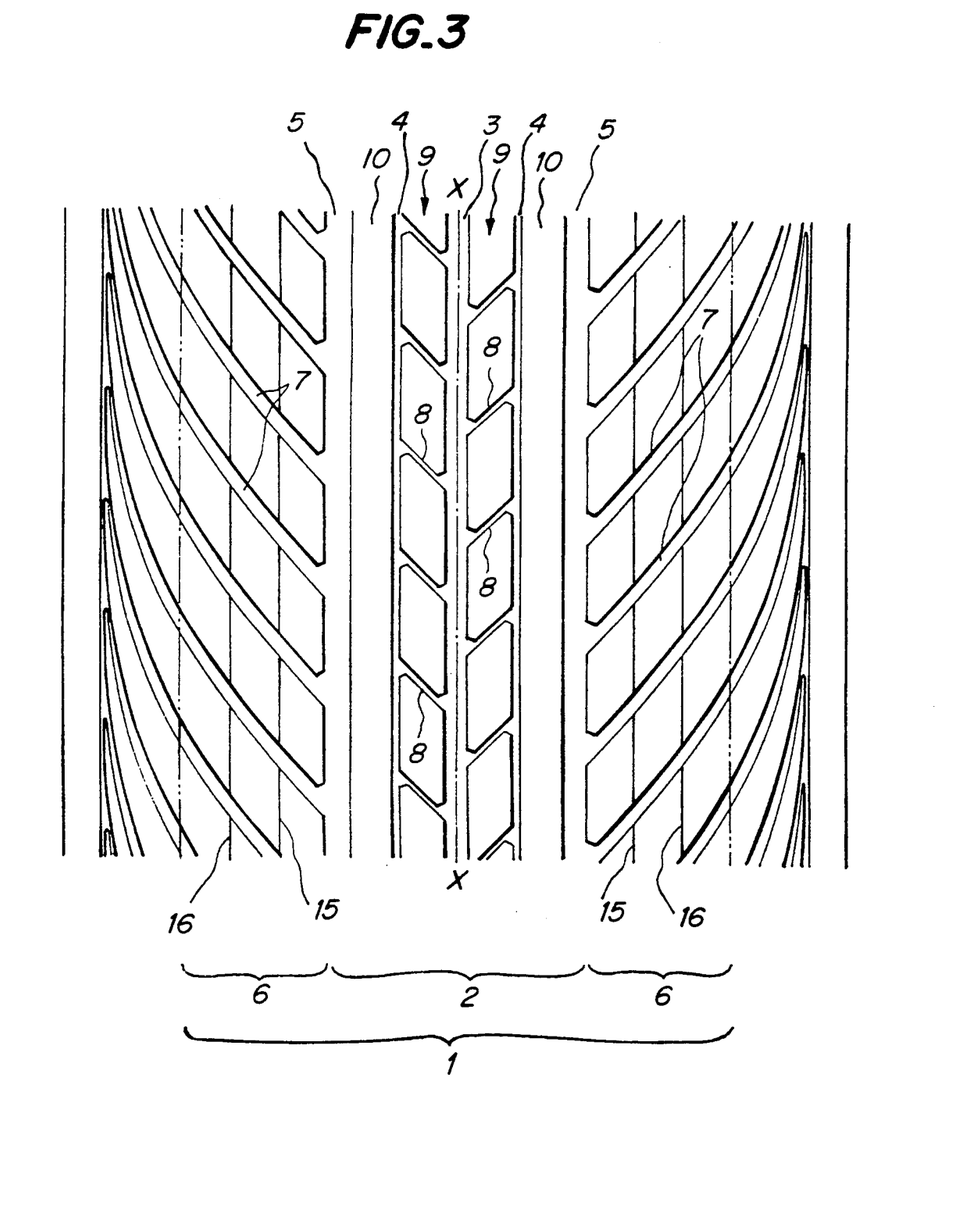

FIG. 3 illustrates a tread pattern of a further embodiment of the present invention. FIG. 3 corresponds to a tread pattern in which the notches 11 are omitted from the rib 10 in FIG. 1(a), and two narrow grooves 15, 16 each having a width of 0.7 mm are continuously formed in each of the side zones 6 in the tire circumferential direction.

Experiments:

Invention tires and a comparative tire having tread patterns described below were subjected to comparison tests concerning levels of pattern noises during straight running and during turning, respectively, and hydroplaning resistance. These comparison tests will be explained.

Test tires: Each test tire had a tire size of 215/65 R15.

Invention tire I: Tire having the tread pattern shown in FIG. 1(a)

Invention tire II: Tire having the tread pattern shown in FIG. 2

Invention tire III: Tire having the tread pattern shown in FIG. 3

Figure 4:
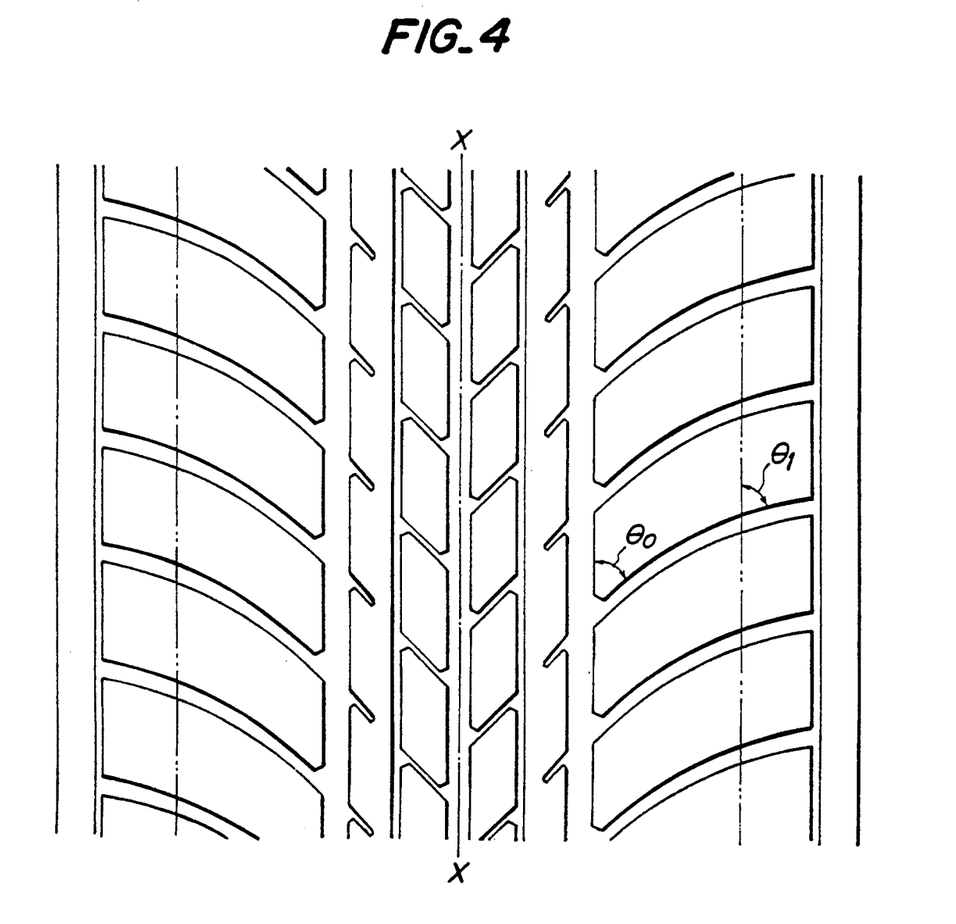
FIG. 4 illustrates a tread pattern of a comparative tire.

Comparative Tire: Tire having a tread pattern shown in FIG. 4, wherein an angle of each of inclined grooves relative to the tire equatorial plane was set at $\theta_0 = 45°$ at an end portion on a side of a central zone and $\theta_1 = 70°$ at the other end portion on a side of an end of a tread.

Testing Methods

Each tire was fitted to an actual vehicle, and filled with a normal internal pressure as prescribed in JIS. Each testing item was evaluated in the state that two persons were on the vehicle.

With respect to the pattern noises during the straight running, noises inside a compartment of the vehicle were evaluated by feeling during drifting from 100 km/h to 40 km.

With respect to the pattern noises during turning, noises inside the compartment of the vehicle were evaluated by feeling during turning at a corner having a radius of 100 m at a speed of 80 km/h.

The hydroplaning resistance was evaluated by a hydroplaning phenomenon-occurring speed during running on a wet road on which water was spread at a depth of 5 mm.

Evaluation Results

Results in those tests are shown in the following table by index.

Evaluation values are given by taking each of the results with respect to Comparative tire as 100. The greater the evaluation value, the more excellent is the result.

TABLE

|  | Comparative tire | Invention tire I | Invention tire II | Invention tire III |
| --- | --- | --- | --- | --- |
| Pattern noise level during straight running | 100 | 100 | 105 | 103 |
| Pattern noise level during turning | 100 | 120 | 120 | 120 |
| Hydroplaning resistance | 100 | 100 | 98 | 99 |

According to the results given in this Table, it is clear that the pattern noises during turning can be greatly reduced according to each of Invention tires.

As mentioned above, according to the present invention, excellent wet performances and dry performances can be exhibited, and the pattern noises during turning of the vehicle can be extremely effectively reduced.

What is claimed is:

1. A pneumatic tire comprising: a tread, said tread including a first pair of circumferentially extending and substantially straight grooves defining axial ends of a central zone of a treading surface thereof and side zones formed between said straight grooves and the edges of the tread, a plurality of inclined grooves formed in both of said side zones of said tread and defining a plurality of inclined land portions therebetween, each of said side zones being axially adjacent to said central zone and having a width equal to substantially $\frac{1}{4}$ of that of said treading surface of the tread, a plurality of said inclined grooves in each of said side zones extending obliquely outward and upwardly from a respective one of said straight grooves to a respective end of the tread as viewed from a front face of said tire in a state that said tire is fitted to a vehicle, and each of said inclined grooves in each of said side zones being opened to said end of the tread, wherein an angle of each of said inclined grooves gradually decreases as the groove extends away from the respective one of said straight grooves and said angle of each of the inclined grooves is in a range of 35° to 55° with respect to a circumferential straight line at a portion near said central zone of the tread and in a range of 15° to 35° with respect to the circumferential straight line at a portion near said respective one end of the tread, and said central zone of the tread further comprises a second pair of circumferentially extending and substantially straight grooves, wherein circumferentially extending ribs are formed between one groove of said second pair of straight grooves and one groove of said first pair straight grooves at axial ends of the central zone of the tread, respectively.

2. The pneumatic tire according to claim 1, wherein at least two rows of blocks are formed in said central zone of the tread.

3. The pneumatic tire according to claim 2, wherein said blocks are staggered in the tire-circumferential direction by a half of a pitch of the blocks between said at least two rows.

4. The pneumatic tire according to claim 2 further comprising a centerline circumferential groove and wherein said rows of blocks are separated from each other by said centerline circumferential groove.

5. The pneumatic tire according to claim 4, wherein each of said circumferentially extending ribs is separated from a row of blocks by one groove of said second pair of straight grooves.

6. The pneumatic tire according to claim 1, wherein at least two continuous circumferential ribs are formed on said central zone of the tread.

7. The pneumatic tire of claim 6 further comprising a series of circumferential spaced notches in said circumferentially extending ribs, said notches inclined at an angle located along extensions of said inclined grooves near said central zone of said tread.

8. The pneumatic tire according to claim 1, wherein at least one narrow groove is formed on at least one of said side zones, said at least one narrow groove extending in a circumferential direction of the tire.

9. The pneumatic tire according to claim 1, wherein a width of each of the inclined grooves is gradually decreased from the side of the central zone to the tread end.

10. The pneumatic tire according to claim 1, wherein each of the inclined grooves is extended up to a ground non-contacting zone of the tread axially outwards beyond the tread end.

11. The pneumatic tire according to claim 1 further comprising a centerline circumferential groove, a second pair of circumferentially extending ribs formed between said centerline groove and a groove said second pair of straight grooves.

12. The pneumatic tire according to claim 11 further comprising a series of notches circumferentially spaced in both said pairs of circumferentially extending ribs.

13. The pneumatic tire of claim 12, wherein said notches are at the same angle.

* * * * *